(12) United States Patent
Sawada

(10) Patent No.: US 7,128,830 B2
(45) Date of Patent: Oct. 31, 2006

(54) PURIFYING DEVICE

(76) Inventor: Yoshiyuki Sawada, 28-2, Ohaza-Atsumogo, Toyoura-cho, Toyoura-gun, Yamaguchi 759-6314 (JP)

( * ) Notice: Subject to any disclaimer, the term of this patent is extended or adjusted under 35 U.S.C. 154(b) by 352 days.

(21) Appl. No.: 10/433,655

(22) PCT Filed: Mar. 21, 2001

(86) PCT No.: PCT/JP01/02247

§ 371 (c)(1),
(2), (4) Date: Jun. 6, 2003

(87) PCT Pub. No.: WO02/48051

PCT Pub. Date: Jun. 20, 2002

(65) Prior Publication Data
US 2004/0112813 A1    Jun. 17, 2004

(30) Foreign Application Priority Data
Dec. 14, 2000    (JP)    ............................. 2000-380917

(51) Int. Cl.
C02F 1/32    (2006.01)

(52) U.S. Cl. ..................... 210/96.1; 210/170; 210/192; 210/205; 210/242.1

(58) Field of Classification Search ................ 210/170, 210/272.1, 747, 242.1
See application file for complete search history.

(56) References Cited

U.S. PATENT DOCUMENTS
5,772,731 A * 6/1998 Harrison .......................... 95/8

FOREIGN PATENT DOCUMENTS

| JP | 51-1880 | 1/1976 |
|---|---|---|
| JP | 55-16818 | 2/1980 |
| JP | 63-126594 | 5/1988 |
| JP | 63-264188 | 11/1988 |
| JP | 6-48882 | 7/1994 |
| JP | 10-272460 | 10/1998 |
| JP | 11-267691 | 10/1999 |
| JP | 2000-202428 | 7/2000 |
| JP | 2002-096073 | 4/2002 |

* cited by examiner

Primary Examiner—Terry K. Cecil
(74) Attorney, Agent, or Firm—Wenderoth, Lind & Ponack, L.L.P.

(57) ABSTRACT

A purifying device comprising a purifying tank (1) having an ultraviolet radiating tube (2) installed within the middle thereof and a submersible pump (3) mounted in the upper region thereof. The purifying tank is held 5 to 100 cm below the water level by floats (7a). A partition (6) divides the region adjacent to the water level into upper and lower levels, wherein only the water on the upper side of the partition (6) is sucked in by the submersible pump (3) for purification in the purifying tank (1), whereby water-bloom, algae or the like floating on water is rapidly collected and decomposed for removal.

6 Claims, 3 Drawing Sheets

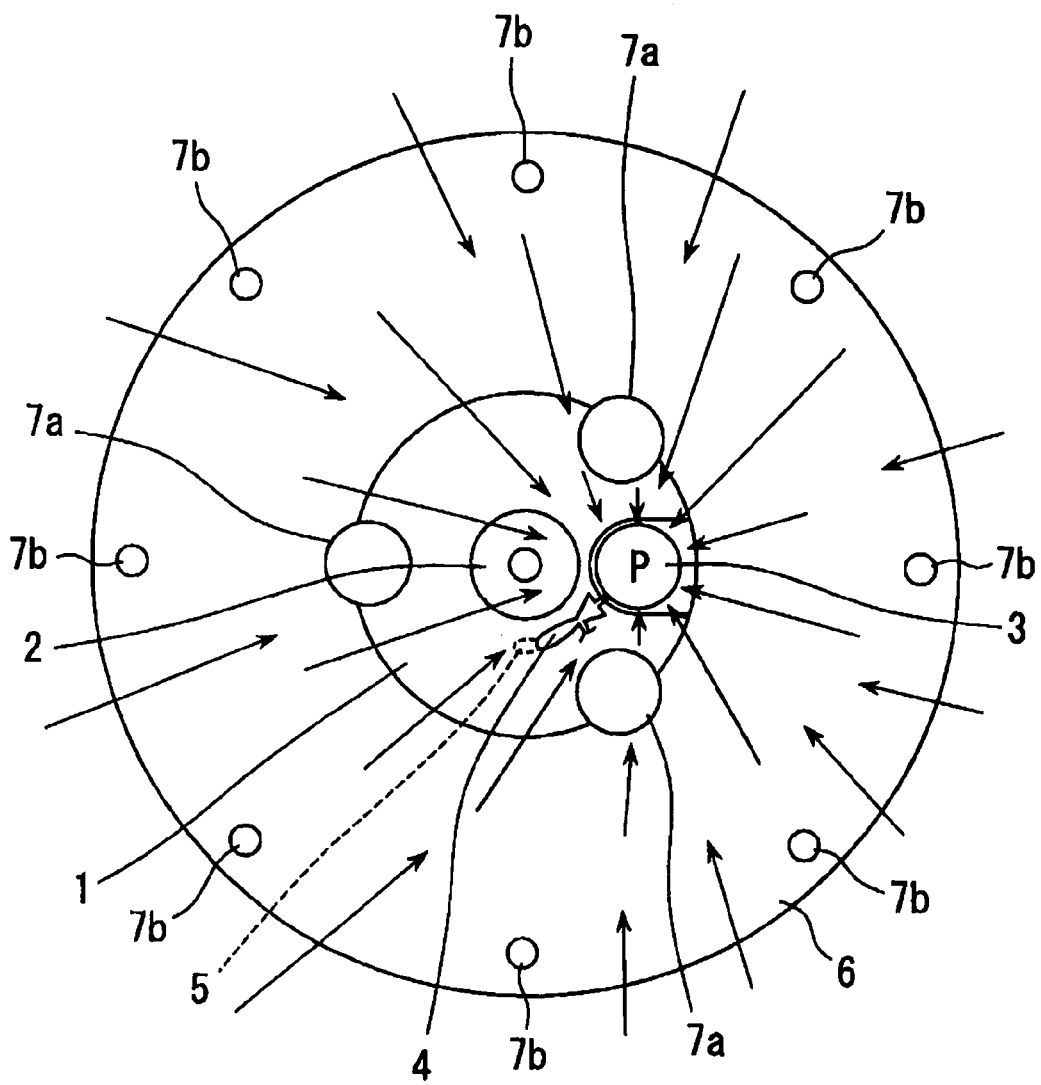

PURIFYING DEVICE

FIELD OF THE INVENTION

The present invention relates to a purifying device for decomposing and removing organic floating substances such as water-bloom and algae floating in lakes, ponds, dams, reservoirs, rivers or the like as well as plankton, which causes red tide.

BACKGROUND OF THE INVENTION

In closed water areas such as lakes, ponds, dams and reservoirs, where any water flow is scarce and is retained for a long time, water-bloom, algae and the like floating on water, if left untreated in a natural state, thrive with high density and decay, which eventually pollutes the water. A conventional method employed for removing water-bloom and algae is, for example, to catch and collect it with a net or the like from a boat. Such an operation, where water-bloom and algae are collected manually, has limited efficiency and takes considerable time when operating on large lakes.

Recently, another kind of purifying device has come into use, which destroys cells of phytoplankton such as water-bloom by a single use of ozone, ultrasonic waves, ultraviolet rays or the like, bringing a marked improvement in efficiency of purification operations in closed water areas. However, most of the conventional purifying devices treat water by blowing ozone into water or collecting sludge-formed decayed substances accumulated on the water bottom.

Therefore, water-bloom and algae that are floating on water in particular cannot yet be collected without operations using boats, hindering complete purification in closed water areas. In view of this, the present inventor proposed, in Japanese Patent Application No. 2000-289005, a purifying device for rivers and lakes which has an improved degree of purification by efficiently decomposing water-bloom and algae and releasing oxygen only.

In the above purifying device for rivers and lakes, water adjacent to the water level is sucked in with a submersible pump, then oxidizing gases such as ozone are added and dissolved in the water sucked in by the submersible pump, and the resulting water is discharged to the rivers or lakes, thereby removing water-bloom and algae near the water level as well as rapidly decomposing them when ozone is used.

With this purifying device, as algae such as water-bloom is collected together with water by suction power of the submersible pump, the submersible pump should have larger suction power in order to increase the speed of sucking in algae to purify water. However, larger suction power would increase the electric power consumed by the submersible pump.

In view of the above problem, an object of the present invention is to provide a purifying device requiring less electric power and that is capable of rapidly collecting floating substances such as water-bloom and algae to purify water in closed water areas with higher efficiency.

DISCLOSURE OF THE INVENTION

The purifying device of the present invention comprises a submersible pump held by a float being adjustable in depth to suck in water adjacent to a water level, a partition to guide water on a side of the water level to a suction port of the submersible pump, a purifying tank to purify the water sucked in by the submersible pump, and a discharge pipe connected to the purifying tank.

According to the present invention, by dividing water adjacent to the water level into upper and lower levels by the partition, only the water on the upper side of the partition can be sucked in by the submersible pump, thereby increasing the flow rate of the water above the partition. In other words, by sucking in the water on the upper side of the partition more rapidly, floating substances such as water-bloom and algae floating on water to be purified can be more rapidly collected and decomposed for purification, and the resulting water can be returned to the water areas to be purified through the discharge pipe.

Preferably, the partition is formed by a stainless steel plate or a plastic sheet and disposed to be substantially parallel to and 5 to 100 cm below the water level to guide the water 5 to 100 cm below the water level toward the suction port of the submersible pump.

As floating substances such as water-bloom and algae are several micrometers in size and mostly float 0 to 300 cm below the water level, the partition may be disposed at any position from 0 to 300 cm below the water level. However, in order to efficiently collect the floating substances, it is preferable to guide only the water 5 to 100 cm below the water level, where the density of the floating substances is highest, toward the suction port of the submersible pump. Furthermore, when the water 5 to 50 cm below the water level is guided, excess water is not sucked in, thereby collecting the floating substances with higher efficiency. The partition disposed at a position more than 5 cm below the water level allows even large substances to be guided to the submersible pump without being retained. Moreover, the partition disposed at a position not more than 100 cm below the water level enables a sufficient flow rate for allowing the floating substances to flow into the suction port of the submersible pump together with water.

Preferably, the present invention further comprises an injector to infuse ozone ($O_3$) into the sucked in water on the downstream side of the submersible pump. By this structure, ozone can be infused into the water adjacent to the water level, which contains water-bloom and algae and is sucked in by the submersible pump. Accordingly, cells of water-bloom and algae are destroyed by ozone and decomposed, and then returned into the water areas to be purified through the discharge pipe.

Preferably, the purifying tank of the present invention is provided with an ultraviolet radiating tube and an ejection head to eject the water in a peripheral direction of the ultraviolet radiating tube. By this structure, the water adjacent to the water level, which contains water-bloom and algae and is sucked in by the submersible pump, is rotated around the ultraviolet radiating tube, thereby rapidly sterilizing and purifying the water with stirring.

In particular, by rotating the water containing water-bloom and algae which was infused with ozone around the ultraviolet radiating tube, the ozone dissolved into the water reacts with ultraviolet rays to generate hydroxy radicals (OH), which have a stronger oxidizing effect than ozone. Thus, the sterilizing and oxidizing effects are enhanced, which enables water-bloom and algae to be almost completely decomposed and cleared. Furthermore, since most of the ozone dissolved in the water reacts and is discharged into water as oxygen, the ozone concentration in the water areas to be purified is not increased. Here, when the inner surface of the purifying tank is finished with a mirror, ultraviolet rays radiated from the ultraviolet radiating tube are reflected by the mirror surface and reach every corner inside the purifying tank, thereby speeding up the reaction of ozone in the purifying tank to further enhance the purifying effect.

Preferably, a cleaning brush is provided which is rotatable around the ultraviolet radiating tube while maintaining contact with the outer periphery of the ultraviolet radiating tube. As the cleaning brush, keeping contact with the outer periphery of the ultraviolet radiating tube, is rotated by the turning force of water which is ejected from the ejection head and flows around the ultraviolet radiating tube, it is possible to remove dead water-bloom and algae and inorganic substances adhered to the ultraviolet radiating tube and, at the same time, prevent them from adhering again. Thus, the ultraviolet rays radiated from the ultraviolet radiating tube are not decreased.

Preferably, the purifying device is provided with a control device to adjust the concentration of dissolved oxygen by mixing nitrogen into water discharged from the discharge pipe. By mixing nitrogen into water having a high concentration of dissolved oxygen due to reaction of ozone dissolved in water with radiation of ultraviolet rays, the concentration of dissolved oxygen is automatically decreased, preventing the oxygen concentration in water from rising to an excessive level.

The advantages of the present invention are as follows.

(1) By dividing the region adjacent to the water level into upper and lower levels with a partition, only the water on the upper side of the partition is sucked in by a submersible pump so that water-bloom and algae floating on water of the water areas to be purified can be collected and decomposed for removal more rapidly. Accordingly, a purifying device requiring less electric power and that is capable of efficient purification of water with the same power consumption as that of the conventional device can be obtained.

(2) The partition guides the water 5 to 100 cm below the water level where the concentration of algae such as water-bloom is highest so that floating substances, regardless of their sizes, can be efficiently sucked in, decomposed and removed.

(3) An injector to infuse ozone into the sucked in water is mounted on the downstream side of the submersible pump and, inside a purifying tank, an ultraviolet radiating tube and an ejection head to eject water in a peripheral direction of the ultraviolet radiating tube are provided. Thus, stronger sterilizing and oxidizing effects can be obtained by hydroxy radicals generated by radiation of ultraviolet rays to ozone, which leads to more rapid decomposition of water-bloom and algae. Moreover, as ozone dissolved into water is reacted and returned to water as oxygen, the ozone concentration in the water areas is not increased.

(4) Around the ultraviolet radiating tube, a cleaning brush is mounted that is rotatable while maintaining contact with the outer periphery of the ultraviolet radiating tube. By this structure, it is possible to remove dead water-bloom and algae adhered to the ultraviolet radiating tube and, at the same time, to prevent them from adhering again. Thus, the ultraviolet rays radiated from the ultraviolet radiating tube are not decreased, and the purifying effect is maintained after continuous use over a long period of time.

BRIEF DESCRIPTION OF THE DRAWINGS

FIG. 3 is a schematic plan view of the purifying device in FIG. 1.

DETAILED DESCRIPTION OF THE INVENTION

Figure 1:
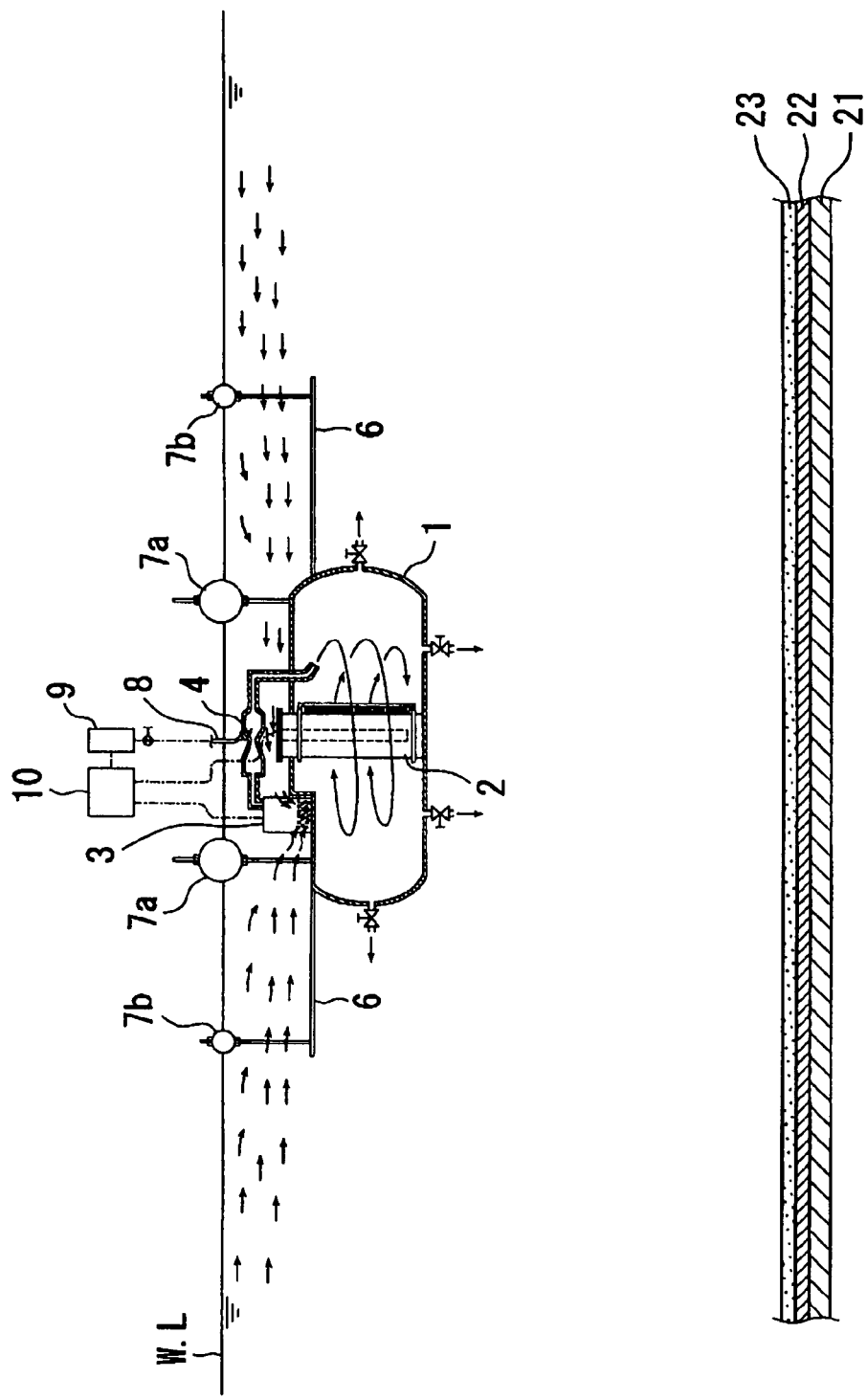
FIG. 1 is a schematic longitudinal sectional view showing a purifying device of the present invention as a whole.
Figure 2:
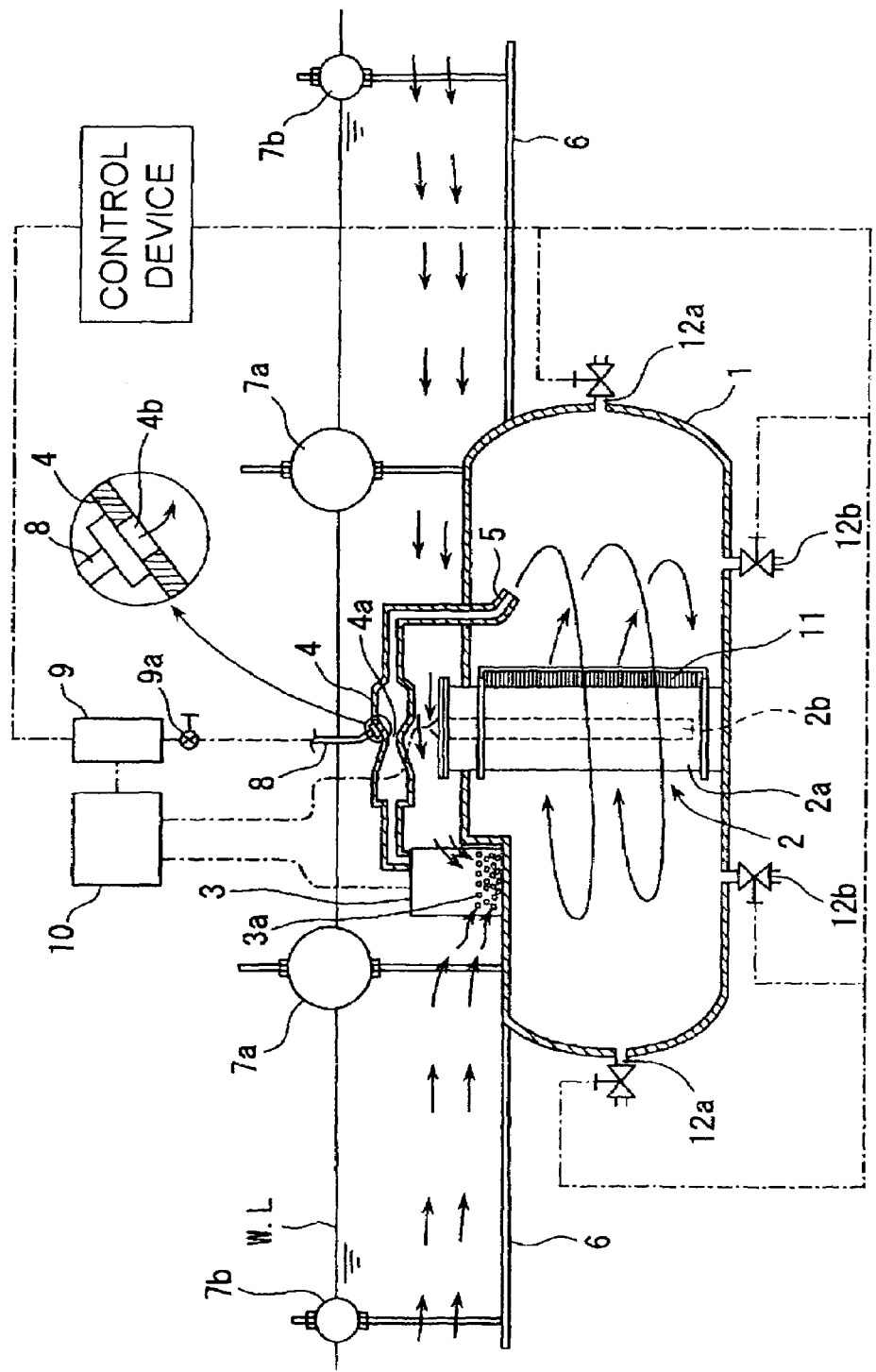
FIG. 2 is an enlarged longitudinal sectional view of the purifying device in FIG. 1.

Referring to the figures, an ultraviolet radiating tube 2 is installed within the middle of a cylindrical-formed purifying tank 1. The inside surface of the purifying tank is finished with a mirror. A submersible pump 3 is mounted in the upper region of the purifying tank 1. An injector 4 for infusing ozone is connected to a discharge port of the submersible pump 3 and an ejection head 5 for ejecting water sucked into the purifying tank 1 is connected to the distal end of the injector 4. A disk-like partition 6 made of a plastic sheet, which forms a plane substantially parallel to the water level, is mounted in a position above the purifying tank 1 and below a suction port 3a of the submersible pump 3.

Three floats 7a are connected to an upper portion of the purifying tank 1. The floats 7a hold the purifying tank 1 such that the purifying tank 1 is adjustable in depth. By adjusting the position of the purifying tank 1 in depth with the floats 7a, the suction port 3a of the submersible pump 3 can also be adjustable in depth from the water level. Floats 7b having the same function as the floats 7a are connected to a peripheral region of the partition 6, making the partition 6 adjustable in depth from the water level.

The injector 4 has a nozzle-like shape with a narrowing portion in the middle of a passage thereof to form a throat 4a. A supply pipe 8 for supplying ozone is connected to an opening 4b opened immediately on the downstream side of the throat 4a. An ozone supplying unit 9 installed on the ground is connected to the supply pipe 8 via a solenoid-controlled valve 9a. Thus, by connecting the supply pipe 8 immediately on the downstream side of the throat 4a, the flow rate of water is increased by the throat 4a, and ozone can be supplied by being sucked into the region having a negative pressure on the downstream side of the throat 4a. Water from the injector 4 is ejected from the ejection head 5 in a peripheral direction of the ultraviolet radiating tube 2.

The ultraviolet radiating tube 2 houses an ultraviolet lamp 2b inside a transparent casing 2a made of quartz. For replacement, the ultraviolet lamp 2b inside the casing 2a can be taken out from the upper side of the purifying tank 1. A cleaning brush 11 is provided, which is rotatable around the ultraviolet radiating tube 2 and maintains contact with the casing 2a on the outer periphery of the ultraviolet radiating tube 2. The cleaning brush 11 is supported to be rotatable in a peripheral direction of the casing 2a at upper and lower distal ends thereof and rotates to follow the water flow inside the purifying tank 1 while maintaining contact with a peripheral surface of the casing 2a. The water flow inside the purifying tank 1 is generated by water being ejected from the ejection head 5.

The ultraviolet lamp 2b, the submersible pump 3 and the ozone supplying unit 9 are driven by electric power supplied from a solar panel 10 which is installed on the ground or the upper region of the purifying tank 1. The ozone supplying unit 9 is a device to decompose the air into nitrogen and oxygen and produce ozone from the oxygen. These components may be driven by wind power energy.

In the above structure, a purifying operation is conducted with the purifying device being suspended in water by buoyancy of the floats 7a, 7b. In this case, the position of the upper side of the partition 6 below the water level is adjusted to be around 5 to 100 cm by using nuts on the upper and lower sides of the floats 7a, 7b. Thus, water adjacent to the water level is divided into upper and lower levels by the partition 6, and only the water on the upper side of the partition 6 is guided and sucked in, thereby efficiently feeding large and small water-bloom and algae floating on a water level into the suction port 3a of the submersible pump 3.

Upon starting the submersible pump 2 and the ozone supplying unit 9 at the same time, the valve 9a is opened to feed ozone to the injector 4 through the supply pipe 8. As the supply pipe 8 is connected to the immediately downstream side of the throat 4a of the injector 4, ozone is fed into the injector 4 by the reduced pressure caused by the increased flow rate of water containing water-bloom and algae, which is being pressurized by the submersible pump 2. Then, the supplied ozone, being dissolved in the water, flows toward the purifying tank 1 and is ejected from the ejection head 5 into the purifying tank 1.

As water is ejected from the ejection head 5 in a peripheral direction of the ultraviolet radiating tube 2 inside the purifying tank 1, the water inside the purifying tank 1 flows around the ultraviolet radiating tube 2. Then, the inside of the purifying tank 1 is pressurized by the pressured water fed from the submersible pump 3, enhancing dissolution of ozone into water. The ozone thus dissolved in water destroys cells of phytoplankton and algae such as water-bloom and increasingly penetrates the cells due to the pressure, and this penetration of dissolved ozone leads to rapid decomposition of water-bloom and algae. BOD, COD, SS and n-hexane are also decomposed by oxidation with ozone and can be reduced.

In the purifying tank 1, ultraviolet rays are radiated from the ultraviolet radiating lamp 2b toward water rotating around the ultraviolet radiating tube 2 to react with ozone contained in water. The reaction of ultraviolet rays with ozone generates hydroxy radicals, which increase the sterilizing and oxidizing effects. Therefore, water-bloom and algae can be almost completely decomposed (99% or more) and removed. In addition, as ultraviolet rays radiated from the ultraviolet lamp 2b are reflected by the inner surface of the purifying tank 1 finished with a mirror to reach every corner inside the purifying tank 1, ozone inside the purifying tank 1 reacts more rapidly to further enhance the purifying effect. A part of the dead water-bloom and algae, which is likely to adhere to the casing 2a due to the heat of the ultraviolet radiating tube 2, is cleaned and removed by the cleaning brush 11 which rotates, while maintaining contact with the outer periphery of the casing 2a along with the water flow around the ultraviolet radiating tube 2.

The water purified in the purifying tank 1 is discharged from valved discharge pipes 12a, 12b connected to the lateral side and the bottom side of the purifying tank 1, respectively. Then, since the ozone sucked in by the injector 4 has almost finished the reaction with the ultraviolet rays radiated from the ultraviolet radiating pipe 2, the ozone concentration of the water discharged from the valved discharge pipes 12a, 12b does not exceed the standard value, or is substantially zero, and the purified water does not affect the ozone concentration of whole water.

With the conventional devices using only ultrasonic waves or ultraviolet rays, plankton such as water-bloom is merely destroyed in bladders or killed, but cannot be decomposed. On the other hand, the purifying device of the present invention can completely decompose plankton by the use of hydroxy radicals generated by radiation of ultraviolet rays to ozone. Specifically, according to the conventional devices, when plankton is killed only by ultrasonic waves or ultraviolet rays and deposited on the water bottom, the dead plankton forms sludge because the dead plankton is organic, and oxygen in water is consumed for decomposing the sludge of organic matter. Accordingly, the oxygen-free condition spreads from the bottom, leading to an anaerobic condition in whole water to possibly generate a foul odor. However, in the purifying device of the present invention, plankton is completely decomposed, and the decomposed plankton, if it is deposited on the bottom, does not decay nor generate a foul odor.

Furthermore, as ozone is changed to oxygen by reaction with ultraviolet rays, the water discharged from the discharge pipes 12a, 12b has a high concentration of dissolved oxygen. By the pressure inside the purifying tank 1, the water having a high concentration of dissolved oxygen discharged from the discharge pipe 12b is carried to the water bottom. As a result, a permeable anaerobic layer 22 as well as an aerobic layer 23 are formed on a sludge layer 21 on the bottom, and the aerobic layer 23 provides a habitat of aerobic microorganisms. The microorganisms living in the aerobic layer 23 take in a part of organic matters sinking from the above as food and decompose them.

As described above, by dividing the region adjacent to the water level into upper and lower levels by the partition 6 and sucking in only the water on the upper side of the partition 6 with the submersible pump 3, water-bloom and algae floating on water can be rapidly collected and decomposed for removal. Consequently, a purifying device requiring less electric power capable of efficient purification of water with the same power consumption as that of the conventional device can be obtained.

In the present embodiment, the purifying tank 1 and the submersible pump 3 are structured to suspend in water. However, it is possible that only the submersible pump 3 and the partition 6 are suspended in water with the floats 7a, 7b or the like, whereas the purifying tank 1 is installed on the ground. In this case, the submersible pump 3 is connected to the purifying tank 1 via a hose, and the water purified in the purifying tank 1 on the ground is returned into water through the hose.

The purifying device according to the present invention is not limited to the device in the above-described embodiment and may be a purifying device similar to the one in Japanese Patent Application No. 2000-289005 proposed by the present inventor. In effect, any structure having a partition to guide the water on the upper side thereof to a suction port of a submersible pump suspended in water with a float and a pump to suck in only the water on the upper side of the partition can realize rapid collection and removal of water-bloom and algae floating on water.

In the embodiment, the described structure has the single ultraviolet radiating tube 2 installed within the middle of the purifying tank 1. It is still possible to install about three or four ultraviolet radiating tubes in such a manner that a plurality of ultraviolet radiating tubes surround the ultraviolet radiating tube 2. This structure can enhance the reaction effect of ozone by radiation of ultraviolet rays in the purifying tank 1, which would allow the purifying tank 1 to be larger for purifying a larger water area.

In the embodiment, it is possible to mount a control device to automatically adjust the concentration of dissolved oxygen in water by mixing nitrogen removed from the ozone supplying unit 9 into the water discharged from the discharge pipes 12a, 12b. In this case, as nitrogen removed from the ozone supplying unit 9 is mixed with carbon dioxide, which water-bloom, algae or the like prefers, it is necessary to separate carbon dioxide from nitrogen before mixing. Thus, although the water discharged from the discharge pipes 12a, 12b has a high concentration of dissolved oxygen as described above, it is possible to prevent the oxygen concentration from rising to excess by mixing nitrogen into the water to automatically lower the concentration of dissolved oxygen. Furthermore, as carbon dioxide is separated from the nitrogen to be mixed, water-bloom and algae are not activated. In addition, since the nitrogen to be mixed and ozone to be supplied to the purifying tank 1 are removed from the same air by the ozone supplying unit 9, natural resources can be utilized without being wasted.

An example of purifying treatment in a pond using the purifying device of the above-described embodiment will be explained below. The partition 6 of the purifying device of this example is 1 m in diameter and was installed in water so that the upper surface of the partition 6 was positioned 100 cm in depth from the water level when purifying water. The water before purification (at the position of the suction port 3a of the submersible pump 3) was compared to the water after purification (at the position of valved discharge pipes 12a, 12b) with regard to their chlorophyll concentrations.

As a result of the comparison, while the chlorophyll concentration of the water before purification was 190 µg/L, the chlorophyll concentration of the water after purification was 0.9 µg/L, and it has been proved that the chlorophyll concentration of the water after purification was decreased to the level 0.5% or less of the concentration of the water before purification.

INDUSTRIAL APPLICABILITY

As described above, the purifying device of the present invention is useful as a device to decompose and remove water-bloom and algae floating on surfaces of closed water areas such as lakes, ponds, dams and reservoirs and flowing waters such as rivers, as well as organic floating matter such as plankton which causes red tide. The device reduces foul odors, colors, BOD, COD, SS and n-hexane and is also useful to prevent viruses and bacteria from multiplying.

The invention claimed is:

1. A purifying device comprising:
   a purifying tank for purifying water from a body of water, said tank including treating means positioned therein;
   a submersible pump coupled to said purifying tank and having a suction port for sucking water in from the body of water and a discharge port for supplying the water to said purifying tank;
   a discharge pipe connected to said purifying tank for discharging purified water from said purifying tank;
   a partition for dividing the water adjacent to a water level into an upper region and a lower region, and for guiding the upper region of the water to said suction port of said submersible pump while blocking the lower region of the water from entering said submersible pump, wherein said partition is in the form of a thin plate or a sheet coupled to said purifying tank and is disposed to be substantially parallel to the water level; and
   at least one first float adjustably coupled to said purifying tank and at least one second float adjustably coupled to said partition for supporting said purifying tank and said submersible pump, and for adjusting a depth of said purifying tank and said submersible pump in the body of water.

2. The purifying device of claim 1, wherein said partition is arranged to be positioned 5 to 100 cm below the water level.

3. The purifying device of claim 1, further comprising:
   an injector for infusing ozone into the water sucked in by said submersible pump on a downstream side of said submersible pump; and
   an ultraviolet radiating tube provided in said purifying tank;
   wherein an ejection head is coupled to said discharge port of said pump for supplying the water from said submersible pump to said purifying tank in a peripheral direction of said ultraviolet radiating tube.

4. The purifying device of claim 3, further comprising a cleaning brush rotatably mounted in contact with an outer surface of said ultraviolet radiating tube.

5. The purifying device of claim 3, wherein an inner surface of said purifying tank is provided with a mirror.

6. The purifying device of claim 3, further comprising a control device for adjusting a concentration of dissolved oxygen in purified water by mixing nitrogen into water discharged from said discharge pipe.

* * * * *